US009009663B2

(12) United States Patent
Kunze

(10) Patent No.: US 9,009,663 B2
(45) Date of Patent: Apr. 14, 2015

(54) CARTRIDGE-BASED PACKAGE MANAGEMENT

(75) Inventor: Tobias Kunze, Palo Alto, CA (US)

(73) Assignee: Red Hat, Inc., Raleigh, NC (US)

( * ) Notice: Subject to any disclaimer, the term of this patent is extended or adjusted under 35 U.S.C. 154(b) by 397 days.

(21) Appl. No.: 13/151,193

(22) Filed: Jun. 1, 2011

(65) Prior Publication Data
US 2011/0295984 A1    Dec. 1, 2011

Related U.S. Application Data

(60) Provisional application No. 61/350,442, filed on Jun. 1, 2010, provisional application No. 61/350,444, filed on Jun. 1, 2010.

(51) Int. Cl.
| G06F 9/46 | (2006.01) |
| G06F 9/445 | (2006.01) |
| G06F 11/34 | (2006.01) |
| G06F 9/44 | (2006.01) |
| G06F 9/455 | (2006.01) |

(52) U.S. Cl.
CPC .............. G06F 8/62 (2013.01); G06F 11/3409 (2013.01); *G06F 9/45558* (2013.01); G06F 8/63 (2013.01); G06F 9/4446 (2013.01); G06F 9/44505 (2013.01); *G06F 9/45533* (2013.01); *G06F 9/44536* (2013.01)

(58) Field of Classification Search
CPC ............ G06F 9/45533; G06F 9/45537; G06F 9/5077; G06F 11/301; G06F 2212/151; G06F 8/60–8/63; G06F 8/65–8/71; G06F 2009/45595; G06F 17/30203; G06F 9/45558

USPC ......... 717/168, 169, 174, 175, 171, 172, 176; 718/106

See application file for complete search history.

(56) References Cited

U.S. PATENT DOCUMENTS

| 5,586,304 | A | * | 12/1996 | Stupek et al. ............... 717/170 |
| 6,009,274 | A | * | 12/1999 | Fletcher et al. ............. 717/173 |
| 6,330,717 | B1 | * | 12/2001 | Raverdy et al. ............ 717/170 |
| 6,347,396 | B1 | * | 2/2002 | Gard et al. ................. 717/168 |
| 6,854,112 | B2 | * | 2/2005 | Crespo et al. ............... 717/174 |
| 6,986,148 | B2 | * | 1/2006 | Johnson et al. ............. 719/332 |
| 7,356,503 | B1 | * | 4/2008 | Johnson et al. ............. 705/38 |
| 7,584,471 | B2 | * | 9/2009 | Bjare et al. ................. 717/178 |
| 7,962,918 | B2 | * | 6/2011 | Schaefer et al. ............ 719/313 |
| 8,230,417 | B1 | * | 7/2012 | Clark et al. ................ 717/174 |
| 8,429,630 | B2 | * | 4/2013 | Nickolov et al. ........... 717/148 |

(Continued)

OTHER PUBLICATIONS

Identifying Components in Object-Oriented Programs using Dynamic Analysis and Clustering—Simon Allier DIRO Universite de Montreal Universite de Bretagne-Sud—Houari A. Sahraoui DIRO Universite de Montreal—Salah Sadou VALORIA Universite de Bretagne-Sud-CASCON '09—2009.*

*Primary Examiner* — Lewis A Bullock, Jr.
*Assistant Examiner* — Francisco Aponte
(74) *Attorney, Agent, or Firm* — Lowenstein Sandler LLP

(57) ABSTRACT

A method for establishing a support environment for a program may include identifying one or more support environment features depended upon by the program to run on one or more nodes, selecting one or more support software components indicated to provide the features, loading the selected support components on the one or more nodes, configuring the selected support components based on the program, and causing the program and the selected support components to be executed on one or more nodes.

22 Claims, 19 Drawing Sheets

(56) References Cited

U.S. PATENT DOCUMENTS

| | | | |
|---|---|---|---|
| 8,448,164 B2* | 5/2013 | Greiner et al. | 717/174 |
| 2003/0051066 A1* | 3/2003 | Pace et al. | 709/316 |
| 2004/0128669 A1* | 7/2004 | Furst et al. | 717/178 |
| 2005/0149940 A1* | 7/2005 | Calinescu et al. | 718/104 |
| 2005/0243729 A1* | 11/2005 | Jorgenson et al. | 370/241 |
| 2009/0031307 A1* | 1/2009 | Chodroff et al. | 718/100 |
| 2010/0333085 A1* | 12/2010 | Criddle et al. | 717/178 |
| 2011/0145836 A1* | 6/2011 | Wheeler et al. | 719/314 |
| 2011/0161952 A1* | 6/2011 | Poddar et al. | 717/173 |
| 2011/0214124 A1* | 9/2011 | Ferris et al. | 718/1 |
| 2011/0225017 A1* | 9/2011 | Radhakrishnan | 705/7.25 |
| 2011/0265164 A1* | 10/2011 | Lucovsky et al. | 726/7 |

* cited by examiner

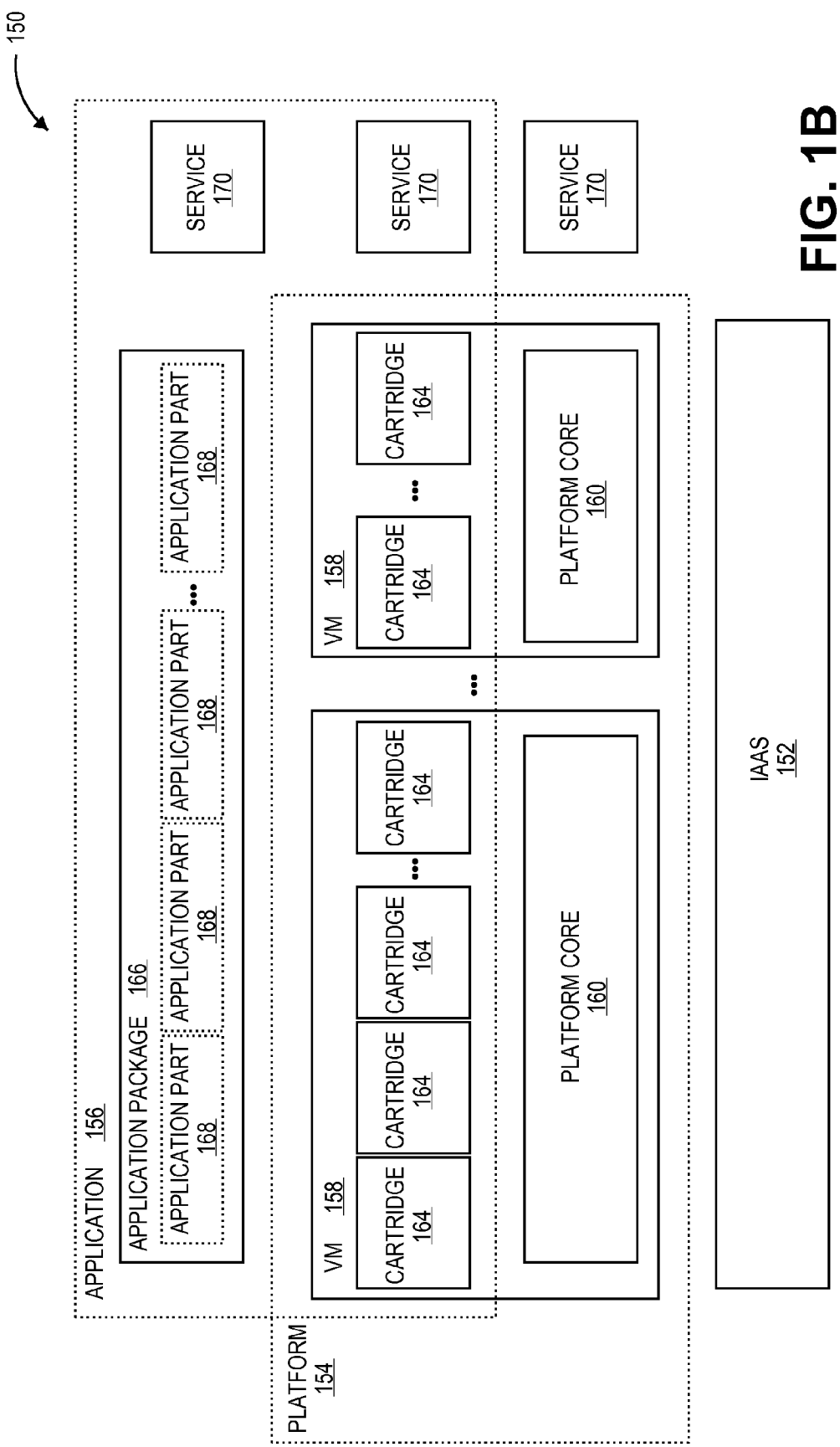

| component | version | features provided | features required | release date | size | resource efficiency | stability | efficacy | cost |
|---|---|---|---|---|---|---|---|---|---|
| PHP runtime | 5.2.9 | php-5.2 | dynamic_server | 10/5/2009 | 17.3 mb | 3 | 10 | 6 | $50 |
| PHP runtime | 5.2.10 | php-5.2 | dynamic_server | 1/6/2010 | 20.1 mb | 2 | 7 | 6 | $50 |
| PHP runtime | 5.2.11 | php-5.2 | dynamic_server | 5/4/2010 | 15.3 mb | 6 | 5 | 9 | $50 |
| Apache | 4 | dynamic_server | | 6/7/2007 | 4 mb | 7 | 6 | 6 | $0 |
| DynoServe | 1 | dynamic_server | | 6/1/2010 | 30 mb | 1 | 9 | 9 | $200 |

Component Catalog Table

FIG. 4

CARTRIDGE-BASED PACKAGE MANAGEMENT

RELATED APPLICATIONS

This application is related to and claims the benefit of U.S. Provisional Patent application Ser. No. 61/350,442 filed Jun. 1, 2010 and U.S. Provisional Patent application Ser. No. 61/350,444 filed Jun. 1, 2010, which are hereby incorporated by reference.

TECHNICAL FIELD

Embodiments of the present invention relate to the application deployment, and more specifically to automatically loading software components associated with an application.

BACKGROUND

It is common for computer programs to need to be loaded simultaneously with one or more support components in order to function properly. For example, a program in the PHP scripting language may need to be loaded simultaneously with a language runtime for the PHP scripting language, and possibly other support components. Where such a program makes use of a feature of the PHP scripting language that first appeared in a particular version of the PHP scripting language, the loaded language runtime for the PHP scripting language must be recent enough to support this feature.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIG. 1B is a block diagram of one embodiment of a Platform-as-a-Service approach for facilitating the execution of a web application in a cloud.

FIG. 4 illustrates a sample component catalog table used by the facility to store information about support components in some embodiments.

DETAILED DESCRIPTION

Figure 1A:
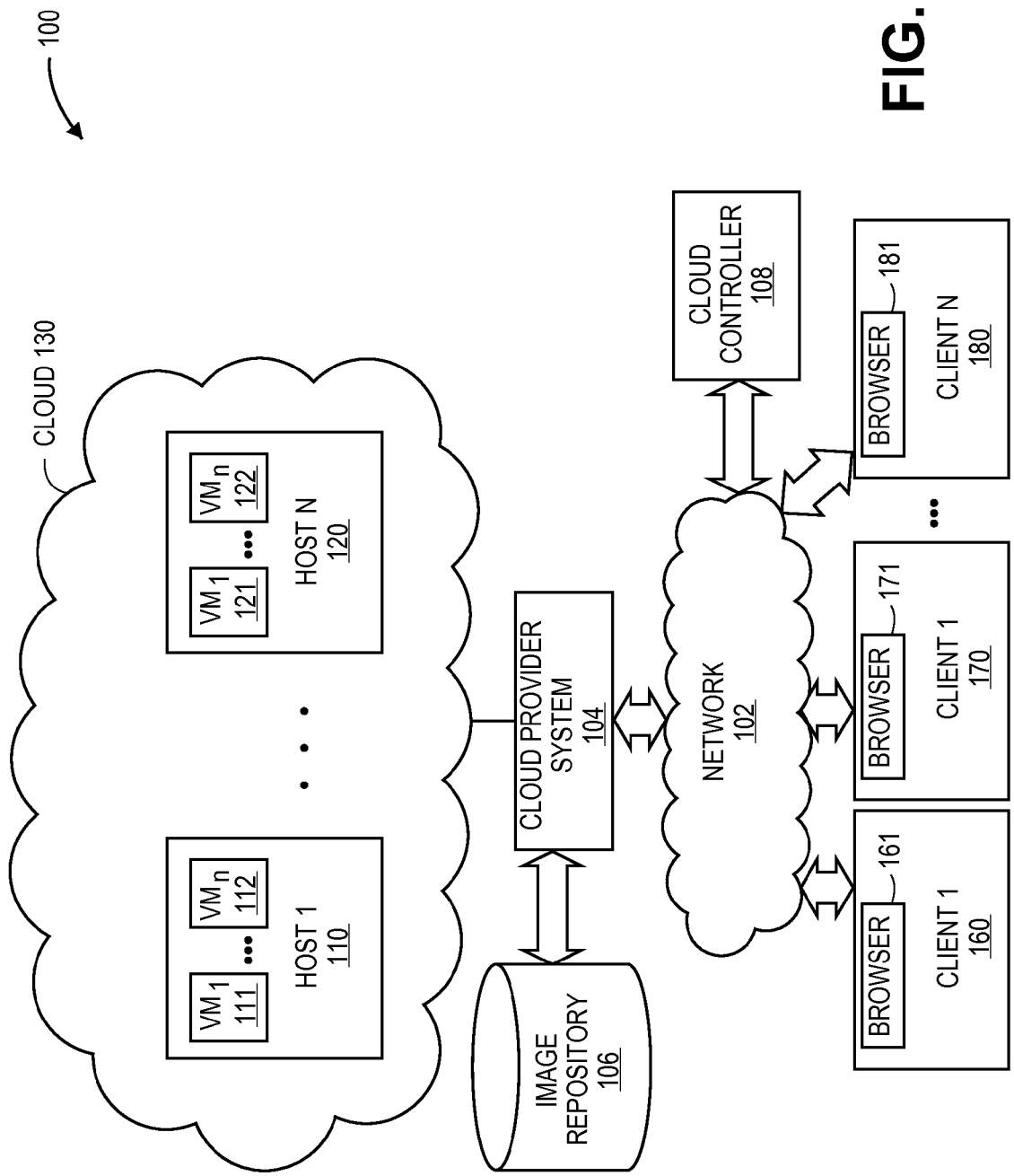
FIG. 1A is a block diagram of a network architecture in which embodiments of the invention may operate.

Described herein are methods and systems for automatically establishing a support environment for a program. A program may depend on several support components. Manually determining an optimized set of support software components to load with a program can be difficult, especially where the exact nature of the program's dependencies on support components is unclear; where support components have cascading dependencies on downstream support components; where such decisions must be made in a dynamic environment in which certain support components can become available or unavailable; and where there are multiple support components that can satisfy a dependency. It can also be difficult to cause manually selected support components to be loaded and initialized in an optimal order.

Embodiments of the present invention provide a software and/or hardware cartridge and package management facility ("the facility") that tracks dependencies of the program on abstract features. In various embodiments, the dependencies of the program on abstract features are expressly declared by the developer of the program, either within the code for the program or externally, such as by being inputted as part of the process of submitting the program. In some embodiments, the facility infers the dependencies of the program on abstract features by automatically analyzing the program's code. The facility may operate as part of a virtual machine running on top of a hypervisor in a host. The virtual machine may be delivered when a single package ("the slab") is installed on the host to run on top of the hypervisor. An application runs on top of this slab.

The facility maps abstract features depended upon by the program to support components that provide these abstract features. A support component together with information identifying the abstract features provided by the support component are sometimes referred to collectively herein as a "cartridge" that the facility can load into and unload from a current configuration that includes the program. In some embodiments, where multiple support components provide abstract features depended upon by the program, the facility uses business logic in order to select an optimal one of these support components. The facility may also automatically manage the loading and initialization of a program together with the selected support components.

In some embodiments, the facility manages cascading dependencies; that is, a support component can itself depend upon abstract features provided by other support components ("downstream support components"). The facility similarly manages the selection, loading, and initialization of these downstream support components, to an arbitrary level of depth.

In some embodiments, the facility responds dynamically to changes in the availability of particular support components. For example, where a support component that is already loaded becomes unavailable, the facility can automatically pause any other components that have dependencies on the unavailable component, including the program, and unload the unavailable component. If an alternative to the unavailable component is available—that is, another support component that also provides the abstract features that were the basis for the original loading of the unavailable support component—the facility can automatically load the alternative support component and other components on which the alternative support component depend. Where a new support component becomes available that the facility's business rules regard more highly than a currently-loaded support component that provides the same features, the facility pauses the components that rely on these features, unloads the currently-loaded support component that provides these features, loads the newly-available support component, and unpauses the paused components.

By behaving in some or all of the ways described above, the facility is able to automatically maintain a set of appropriate, and in many cases optimal, components to support the execution of a program.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

FIG. 1A is a block diagram of a network architecture 100 in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. Users can interact with applications executing on cloud-based virtual machines using client computer systems, such as clients 160, 170 and 180, via corresponding web browser programs 161, 171 and 181.

Clients 160, 170 and 190 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 190 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In one embodiment, the cloud controller 108 provides slabs associated with different applications to the cloud provider 104. As will be discussed in more detail below, a slab is a pre-generated image that can be provided to the cloud provider 104 and stored in an image repository 106. This image may be a virtual machine image or an image of a physical system. Upon receiving a command identifying a specific slab, the cloud provider 104 retrieves the corresponding image from the image repository 106, creates an instance of it and loads it on the host 110, 120 to run on top of a hypervisor (not shown). The command may be received from the cloud controller 108 or a user (e.g., a system administrator) via a console computer or a client machine. The image repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The image repository 106 may also store application packages and cartridges (packages of applications' support components). Alternatively, application packages and/or cartridges may be stored in one or more other repositories (not shown) residing locally or remotely. The cloud provider 104 or the cloud controller 108 may load an application package on the host 110, 120 to run on top of the slab. A package manager executing in the slab may then determine the application's dependencies, identify cartridges based on the dependencies, and automatically load the cartridges to support the application during execution.

While various embodiments are described in terms of the environment described above, those skilled in the art will appreciate that the slab may be implemented in a variety of other environments including a single, monolithic computer system, as well as various other combinations of computer systems or similar devices connected in various ways.

FIG. 1B is a block diagram of one embodiment of a Platform-as-a-Service (PaaS) environment 150 for facilitating the execution of a web application in a cloud. The PaaS environment 150 includes an Infrastructure-as-a-Service (IaaS) 152, which consists of hardware (e.g., one or more processors, memory, IO devices, etc.) and a hypervisor, and a platform 154 running on the IaaS 152. The platform 154 is delivered as an auto-clustering virtual machine image, resulting in one or more virtual machines 158, each containing a platform core 160 and a component layer in form of cartridges. The platform core 160 may include the guest OS with the kernel, distributed services, a data transport, data services and a monitoring component. Distributed services allow communication between platforms when the application runs on multiple platforms (a cluster) executing on one or more hypervisors in one or more hosts. The monitoring component receives monitoring data from cartridges 164, the guest OS and kernel and passes it to the data services that store this data in a data store inside the platform 154 and allows querying of this data by the user(s) and/or client(s). The monitoring data may describe the behavior and measure the performance of cartridges 164, other components of the platform 154, elements of hardware and the application 156. Data transport communicates data between different components of the platform 154 and between different platforms when applicable.

The component layer provides a variety of middleware, framework and other support software in form of cartridges 164. In various embodiments, the middleware/framework components can include such components as Java, Apache, MySQL, PHP, JBoss, and Tomcat. Application 156 includes an application package 166 containing multiple application parts 168 which may correspond to different individually deployable modules of the application. Application 156 may be an n-tiered web applications based on languages such as Java, Ruby, Python, PHP or the like. The PaaS environment 150 may also include external services 170 on which the application 156 depends.

An application package may be provided by a user or created automatically based on information about the application that is provided by a user via a user interface or by other means. The platform core 160 and cartridges 164 may be provided by the PaaS provider. Cartridges 164 are not packaged with the application 156. Instead, the application package 166 expresses a dependency on platform services provided by cartridges. The platform 154 then imports the appropriate cartridges 164 at deployment time.

The platform 154 automates the process of installing and configuring the application 156. In addition, the platform 154 provides a virtually care-free runtime environment for the application 156 and produces monitoring data describing the performance of the application 156, operating system and support software.

Figure 1C:
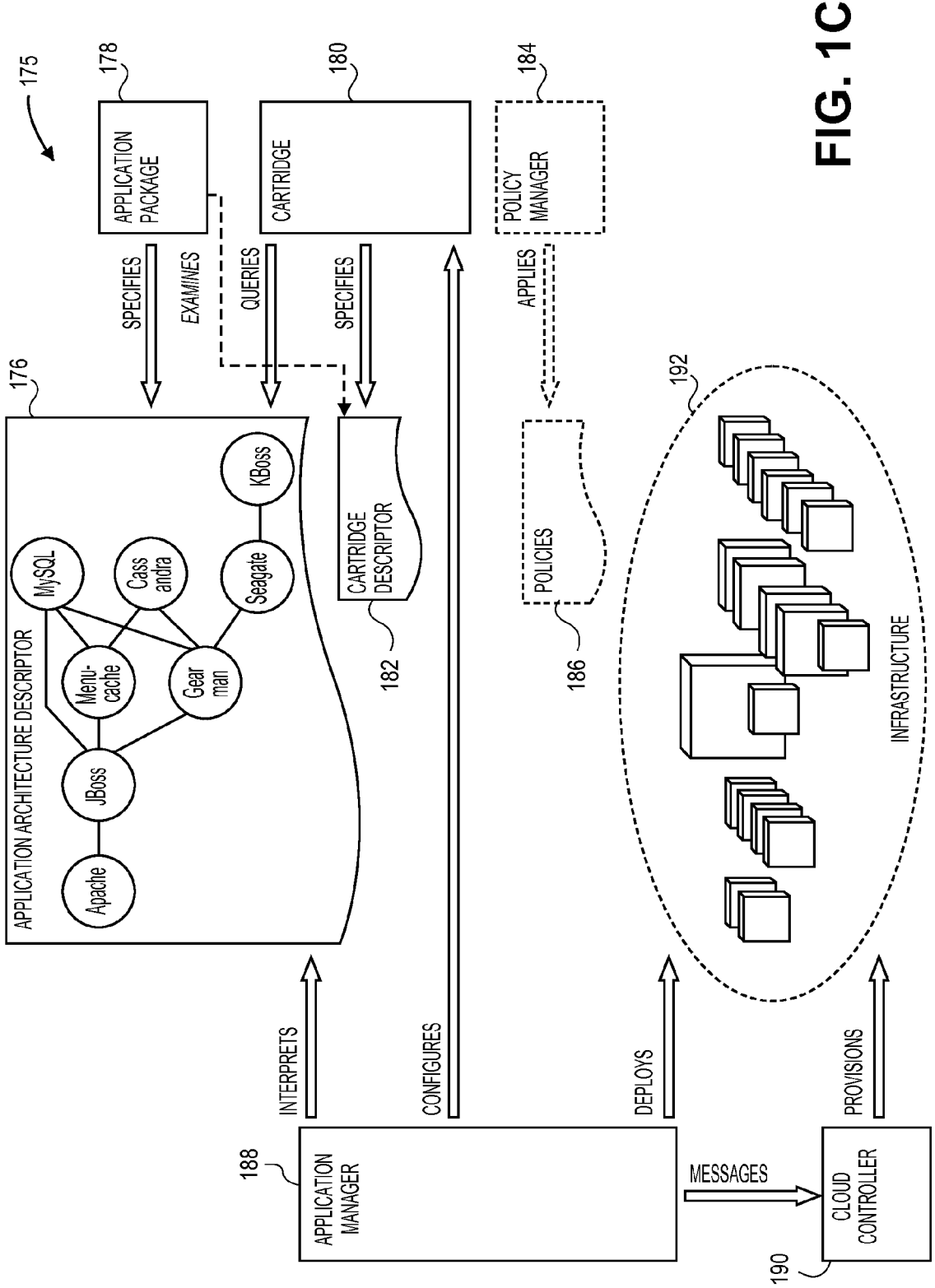
FIG. 1C illustrates provisioning of an application using an application architecture descriptor.

FIG. 1C illustrates provisioning of an application using an application architecture descriptor. An application architecture descriptor 176 expresses the logical architecture of an application and specifies how application parts are to be deployed and provisioned as well as the communication paths between application parts and services.

At deployment of the application, a package manager 175 examines the application architecture descriptor 176 to determine the application's dependencies. The application manager 175 specifies an appropriate application package 178. Based on the dependencies, the package manager 175 selects appropriate cartridges. Each cartridge 180 has a cartridge descriptor 182 defining characteristics of the cartridge, which are used to select an appropriate cartridge for the application.

An application manager 188 interprets the application architecture descriptor 176 to determine how a cartridge 180 should be configured and—once the application has been provisioned—configures the cartridge 180 accordingly. E.g., it may configure a PHP cartridge to load a number of PHP extensions on behalf of the application or it may configure a Tomcat cartridge to listen on a given port and address the application under a given context root or it may configure an Apache cartridge to rewrite certain requests or allow access to the application only for a given subset of clients, etc. The policy manager 184 applies policies 186 as appropriate. The application manager 188 also communicates with a cloud controller 190 (e.g., via a network) to provision the application with appropriate infrastructure 192 (a set of nodes), in accordance to the application architecture descriptor. The set of compute nodes that are part of this provisioning scheme is known as a cluster. From an application perspective, the platform may extend only as far as the cluster reaches. In another embodiment, the platform supports and/or manages cross-cluster communication.

Figure 2:
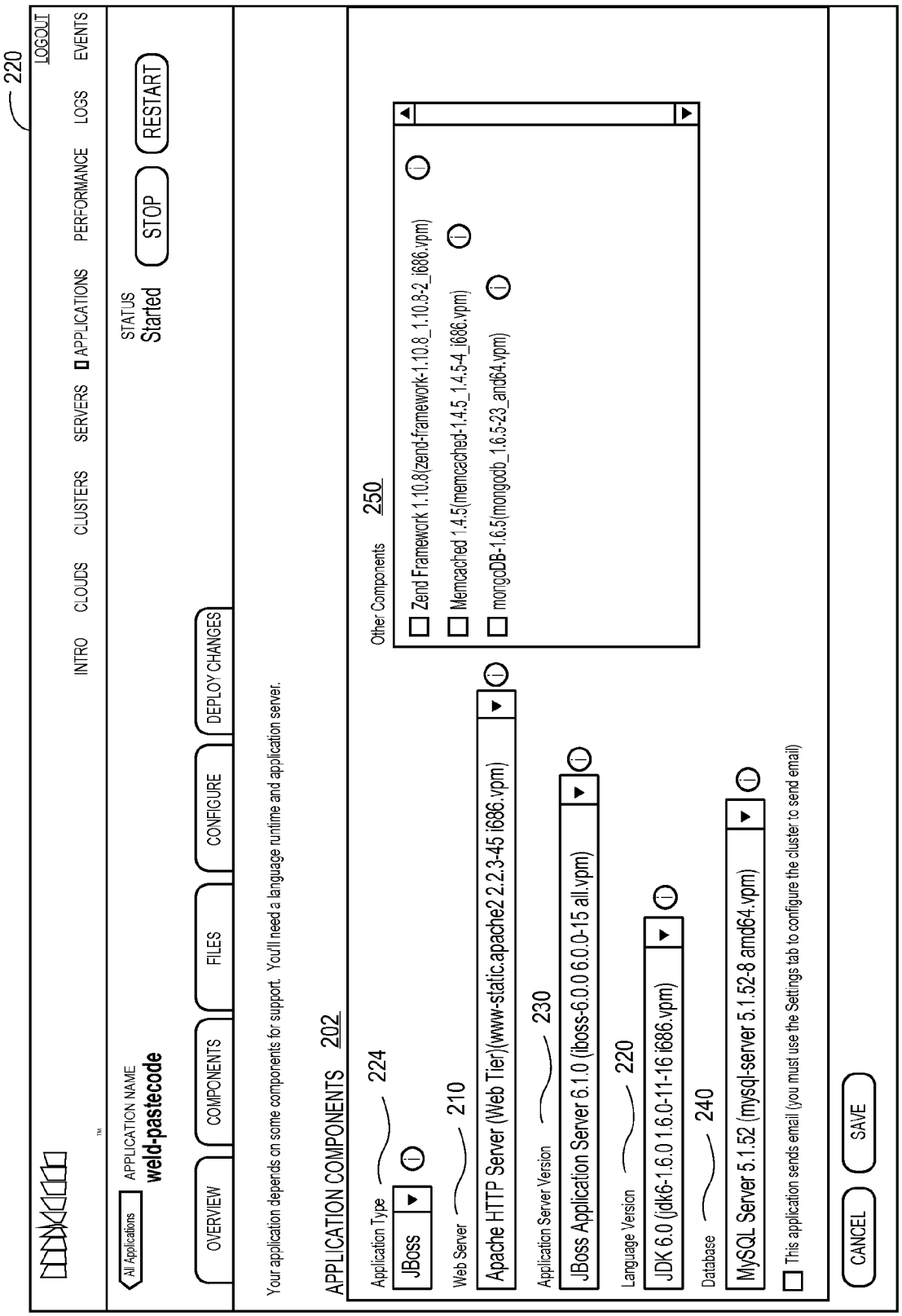
FIG. 2 illustrates an exemplary user interface for specifying dependencies of a web application, in accordance with some embodiments.

FIG. 2 illustrates an exemplary user interface (UI) 200 for specifying dependencies of a web application, in accordance with some embodiments. The UI 200 identifies the application 201 and allows a user to select application components 202 for the application. The application components 202 include properties of the application (e.g., application type 224) and dependencies of the application on features of support software (e.g., web server 210, application server version 230, language version 220, database 240 and other components 250).

After performing the selections, the user selects a save control in order to establish the dependency of this program on the selected components. In some embodiments, the user can select the displayed features, but decline to select particular components, and the facility will automatically select components providing those features.

Figure 3:
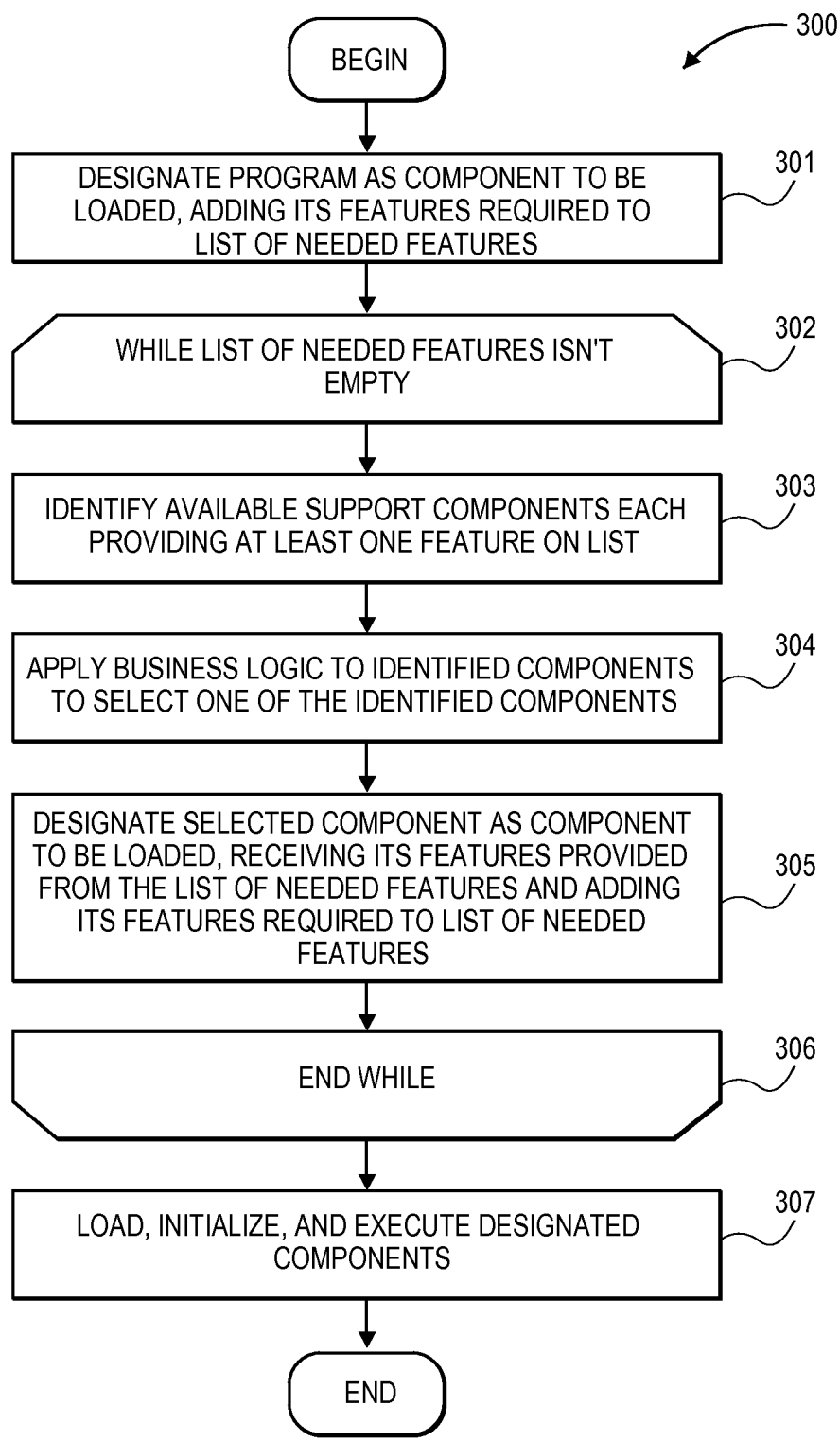
FIG. 3 is a flow diagram of one embodiment of a method for establishing a support environment for a program.

FIG. 3 is a flow diagram of one embodiment of a method 300 for establishing a support environment made up of support components for a program. The method is performed by processing logic that may comprise hardware (circuitry, dedicated logic, etc.), software (such as is run on a general purpose computer system or a dedicated machine), or a combination of both. In one embodiment, the method is performed by a host 110, 120 of FIG. 1 (and in one embodiment, by a platform 154 running on the host on top of the hypervisor).

At block 301, the host designates the program as a component to be loaded. As part of this designation, the host adds the features required by the program to an empty list of needed features. In various embodiments, the dependencies of the program on abstract features are expressly declared by the developer of the program, either within the code for the program or externally, such as by being inputted as part of the process of submitting the program. In some embodiments, the facility infers the dependencies of the program on abstract features by automatically analyzing the program's code. As an example, a sample program has one feature required: php-5.2.

Method 300 then loops through operations 302-305 while the list of needed features is not empty. At block 303, the host identifies available support components each providing at least one feature on the list of needed features. In some embodiments, at block 303, the host uses a component catalog table as a basis for determining which support components provide and require which features.

FIG. 4 illustrates a sample component catalog table used by the facility to store information about support components in some embodiments. The table 400 is made up of rows 401-405, each corresponding to a different support component. Each row is divided into the following columns: a component 411 identifying a component to which the row corresponds; a version column 412 indicating the version of the components in which the row corresponds; a features provided column 413 that lists any features that are provided by the component; a features required column 414 that lists any features that are required by the component; a release date column 415 indicating the release date of the component; besides column 416 showing the amount of memory occupied by the component; a resource efficiency column 417 that contains a score indicating the relative level of resource efficiency provided by the component; the stability column 418 that contains a score indicating the relative level of stability provided by the component; efficiency column 419 containing a score indicating the relative level of efficacy of the component; and a cost column 420 indicating the cost of using the component. For example, row 401 indicates that version 5.2.9 of a PHP runtime component provides the feature php-5.2, which requires the feature dynamic_server, was released on Oct. 5, 2009, has a size of 17.3 MB, has a resource efficiency score of 3, has a stability score of 10, has an efficacy score of 6, and has a cost of $50.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Referring again to FIG. 3, at block 303 the host identifies the components of rows 401-403 as all providing the dynamic_server feature required by the program in the example. At block 304, the host applies business logic to the components identified at block 303 to select one of the components. In some embodiments, at block 304, the host uses a business logic table as a basis for selecting one of the identified components.

Figure 5:
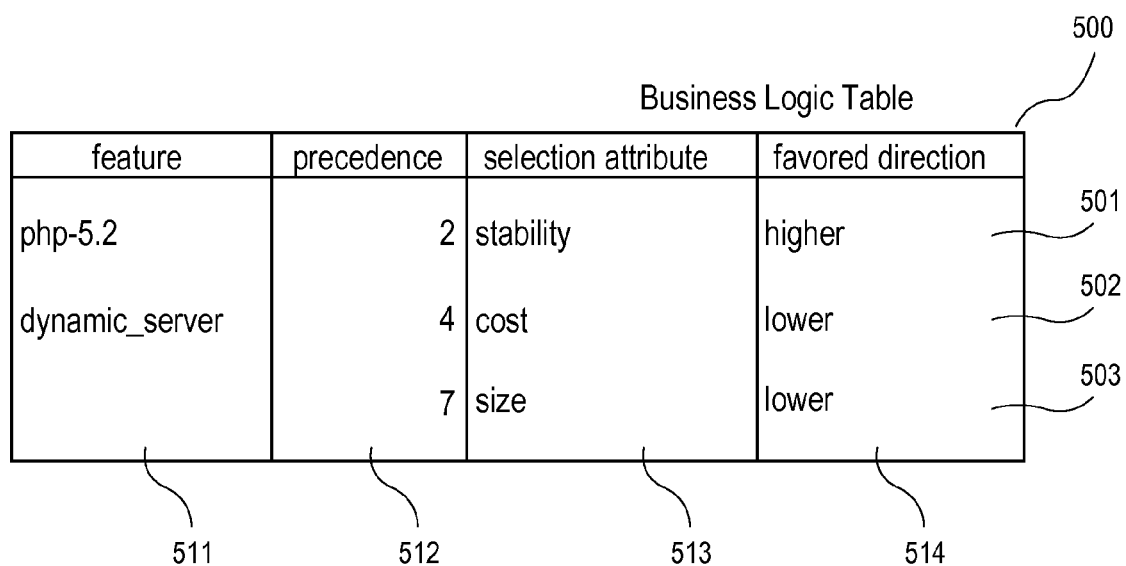
FIG. 5 illustrates a sample business logic table used by the facility to store business logic for selecting support components in some embodiments.

FIG. 5 is a sample business logic table that stores business logic for selecting support components in some embodiments. The table 500 is made up of rows 501-503, each corresponding to a different business logic rule. Each row is divided into the following columns: a feature column 511 indicating a feature to which the rule to which the row corresponds applies; a precedence column 512 indicating the relative precedence of the rule to which the row corresponds; a selection attribute column 513 indicating a selection attribute used by the rule as a basis for selecting a component; and a favored direction column 514 indicating whether higher or lower values of the indicated selection attribute are favored. For example, row 501 indicates that, among components providing the php-5.2 feature, higher stability scores are to be preferred, with a precedence of 2. Where a row does not identify a feature, its rule applies to components identified as providing any feature. For example, row 503 does not identify a feature; as a result, its rule applies to selecting among components providing any feature.

Returning to FIG. 3, at block 304, the host applies the rules of rows 501-503 in order to select one of the components identified at block 303 as providing the php-5.2 feature required by the program. In applying these two rules, the host permits the rule of row 501 to control, as it has the highest precedence score 2 among the precedence scores of the rules of rows 501 and 503, 2 and 7. Among the components of rows 401-403, the host selects the component of row 401, having the highest stability score 10 among stability scores 5, 7, and 10.

At block 305, the host designates the selected component as a component to be loaded. As part of this designation, the host removes features provided by the selected component from the list of needed features, and adds features required by the selected component to the list of needed features.

In accordance with the example, at block 305, the host designates the component of row 401, and removes the feature php-5.2 from the list of needed features as it is provided by the designated component. The facility further adds the feature dynamic_server to the list of needed features, as it is required by the designated component.

At block 306, if the list of new features is empty, then the method continues to block 307, else the method returns to block 302. At block 307, the host loads, initializes, and executes the designated components. In accordance with the example, at block 306, because the list of new features contains the dynamic_server feature and is therefore not empty, the method returns to block 302 in order to select a component providing the dynamic_server feature.

Figure 6:
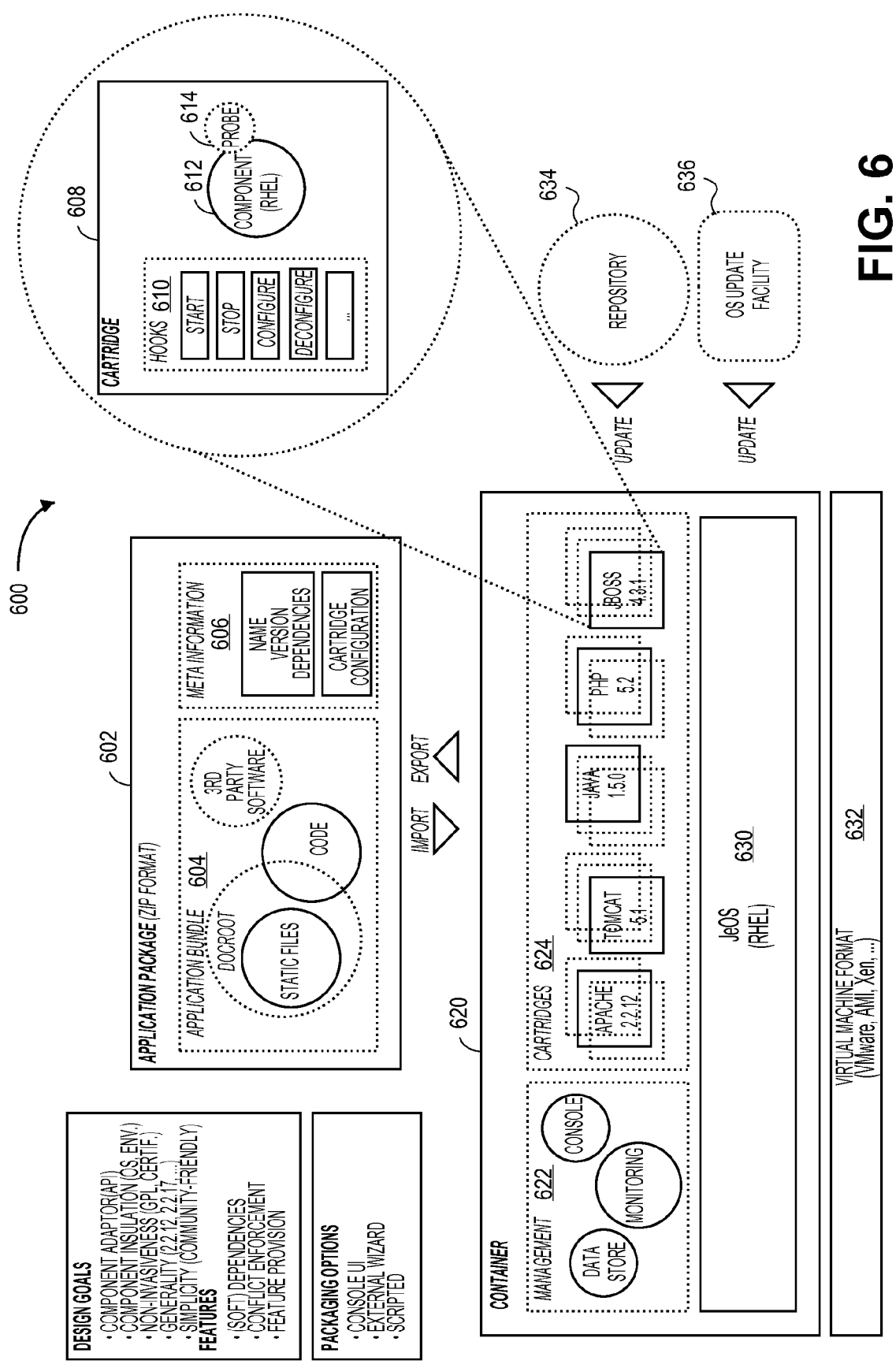
FIG. 6 is a relationship diagram providing an overview of the cartridge system implemented by the facility in some embodiments.

FIG. 6 is a relationship diagram providing an overview of a cartridge system 600 in accordance with some embodiments. The relationship diagram of FIG. 6 shows the population of a flat container 620 with components such as "cartridges" 624 that provide features required by the application. In particular, application package 602 includes an application bundle 604 that may include, for example, static files, code and third party software. In addition, the application package includes meta information 606 that specifies characteristics of the application (e.g., the application name and the application version), dependencies of the application or optionally an application architecture descriptor, and cartridge configuration. Cartridge configuration includes native configuration data. E.g., configuration for an Apache cartridge may, among others, include a native httpd.conf file and configuration for a Tomcat cartridge may include a native server.xml file, among others, and so forth.

The platform (or slab) loaded on top of the hypervisor 632 initially includes the operating system 630, management components 622 and a placeholder for cartridges 624. The operating system 630 may be updated or upgraded using OS update facility 636. The management components 622 include a monitoring component intended to receive monitoring data from cartridges 624 and the operating system 630 during the execution of the application and to store the monitoring data in a data store. The monitoring data can be queried by a user via a console.

Based on dependencies specified in the meta information 606, a package manager finds corresponding cartridges 624 in a repository 634 and adds these cartridges 624 to the container 620. As shown in a cartridge view 608, a cartridge may include hooks 610, a support software component 612 providing support functionality required by the application, and optionally a probe 614. Hooks 610 are executables used to install, remove, start, stop, configure and deconfigure a cartridge, among others. Probe 614 may be a piece of code that generates monitoring data that can (1) directly describe the behavior and measure the performance of the instrumented component(s), and/or (2) indirectly describe the behavior and measure the performance of other components of the platform, elements of hardware, and ultimately the application. Monitoring component in management 622 receives the monitoring information from the probes in cartridges and the operating system 630 and stores this monitoring data in the data store within the container 620. In some embodiments, as part of storing the monitoring data, this monitoring component performs one or more of analyzing the monitoring data, matching related portions of the monitoring data, compressing the monitoring data, and aggregating and/or abstracting the monitoring data.

Figure 7:
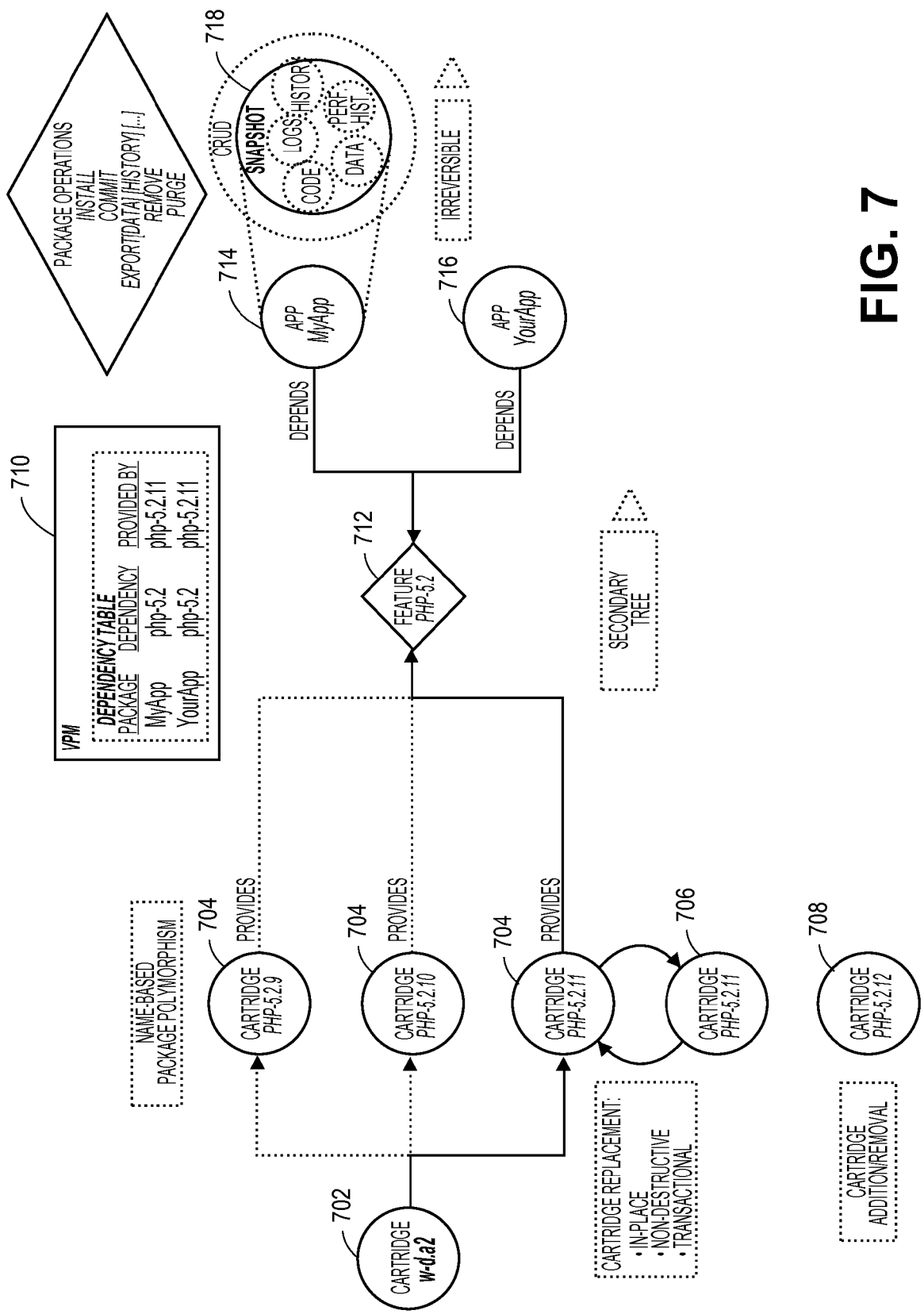
FIG. 7 is a relationship diagram portraying dependency relationships between components and features in some embodiments.

FIG. 7 is a relationship diagram portraying dependency relationships between components and features in some embodiments. The relationship diagram 700 shows a dependency table 710 tracking which components have been loaded to support which other components by providing features required by them. In particular, applications 714 and 716 depend on feature 712 that is provided by cartridges 704 each of which depends on cartridge 702. As shown, the optimal cartridge is php-5.2.11 that is selected for the feature 712.

Subsequently, an alternative cartridge 706 may become available and the selected cartridge may be dynamically replaced in real time (during the execution of the application) by the cartridge 706 without destructing the execution of the application. In addition, if a new cartridge 708 providing additional functionality desired by the application becomes available, this cartridge 708 can be loaded without interrupting the execution of the application.

During the execution of the application, a snapshot 718 can be provided that shows current application code being executed, logs contents, application execution history, application performance history (e.g., memory or CPU usage, timing information, etc.), and data manipulated by the application.

Figure 8:
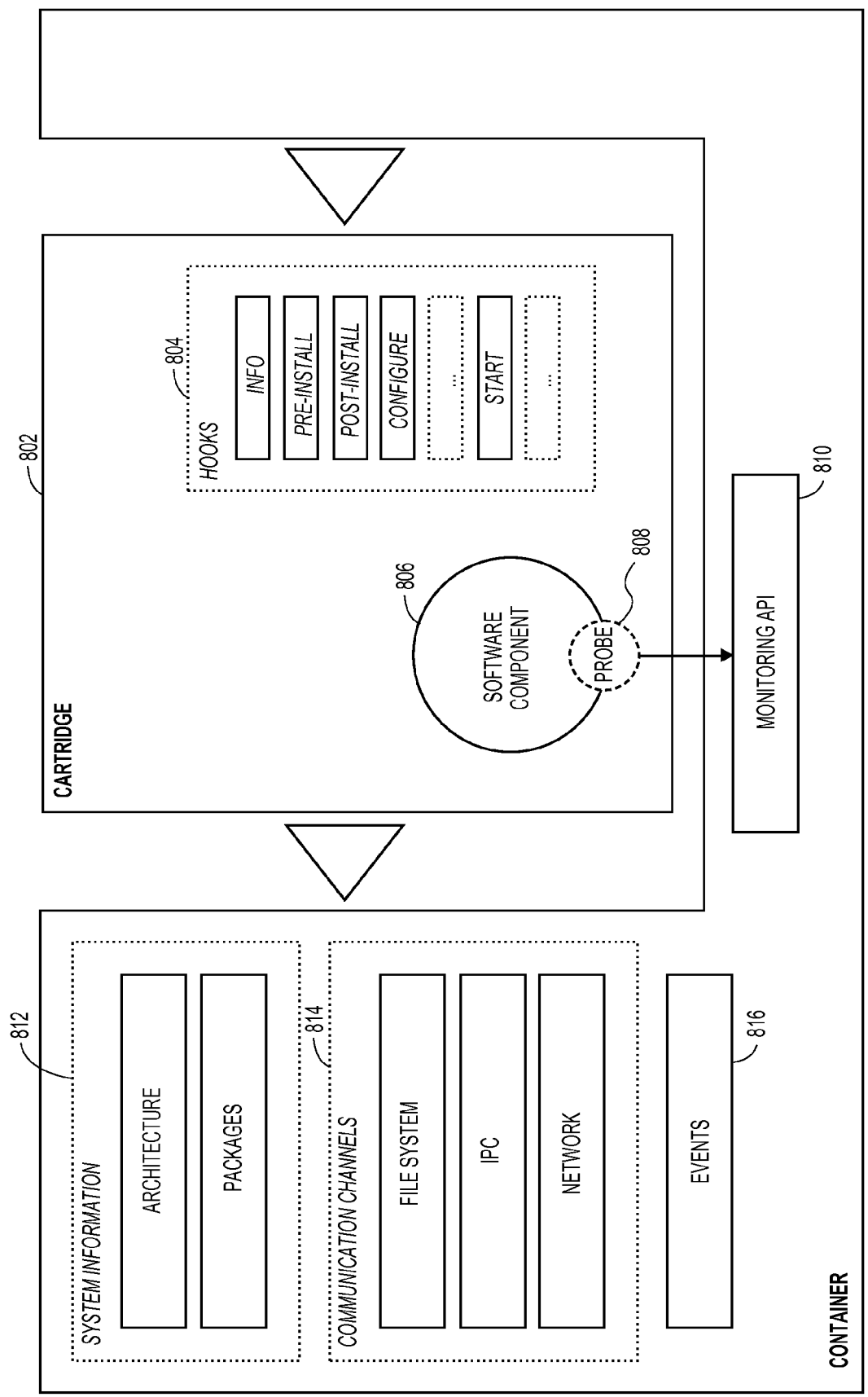
FIG. 8 is a relationship diagram depicting interfaces between cartridges and the platform in accordance with some embodiments.

FIG. 8 is a relationship diagram depicting interfaces between cartridges and the platform in accordance with some embodiments. Cartridge 802 functionality can be called through executable hooks 804 that can, for example, provide a list of hooks present in the cartridge 802, install the cartridge

802, configure or deconfigure the cartridge 802, start or stop the software 806 in the cartridge 802, remove the cartridge, etc. Monitoring API 810 is provided to collect monitoring data generated by probe 808. The cartridge 802 can issue commands to request system information 812 such as information about the architecture and packages installed, and can further communicate with the platform via communication channels 814 such as the file system, interprocess communication (IPC), and a network. In addition, the cartridge 802 can trigger events 816 such as threshold violations, scaling events, notification triggers, etc.

Figure 9:
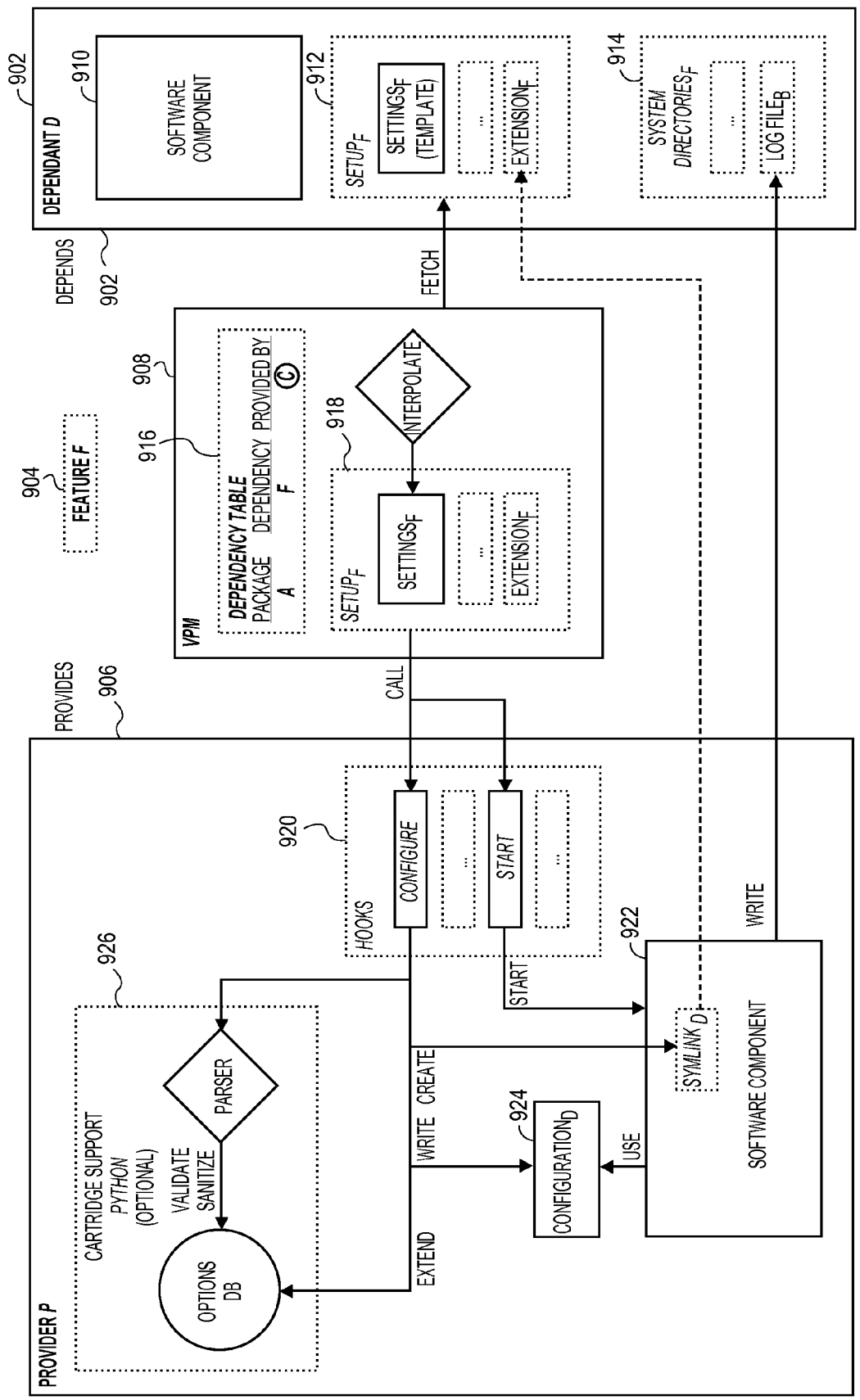
FIG. 9 is a relationship diagram depicting a cartridge extension technique in accordance with some embodiments.

FIG. 9 is relationship diagram depicting a cartridge extension technique used by the facility in some embodiments. The relationship diagram shows an application and package manager ("VPM") 908 that includes a dependency table 916 identifying a dependant entity, features 904 required by the dependent entities and providers of these features. The connection between the dependant and the provider is determined by the platform based on business rules as discussed above. A dependant entity 902 can be an application or a cartridge. A provider 906 is a cartridge providing a desired feature to the dependant 902. Dependant 902 includes a software component 910, configuration 912 and log files 914. Provider 906 includes a software component 922, hooks 920 and an optional cartridge support module 926. A cartridge support module 926, which includes an options database and a parser, is provided to assist cartridge authors to validate and sanitize dependant's cartridge configuration data.

When the provider 906 is selected, it is configured according to configuration specified in the dependant's setup directory 912. The setup directory 912 may include any configuration data that the target cartridge is supposed to be configured with. During configuration, a package manager fetches settings from the setup directory 912, performs runtime interpolation such as pathname or network port number interpolation, and creates a shadow directory 918 in the VPM 908. The package manager then passes the configuration information to a configure hook of the cartridge 906, which invokes the parser of the cartridge support 926 to parse and validate it and write it to the options database. In addition, the cartridge information is saved in a configuration file 924 of the cartridge 906. When the software component 922 is invoked (via a start hook) to run during the execution of the application, the software component 922 uses the configuration file 924 and writes log data to log file 914 on behalf of the application 902. In some embodiments, extensions to the provider cartridge's software component 922 that are contributed by dependant 902 are made available to the software component via symbolic links.

Figure 10:
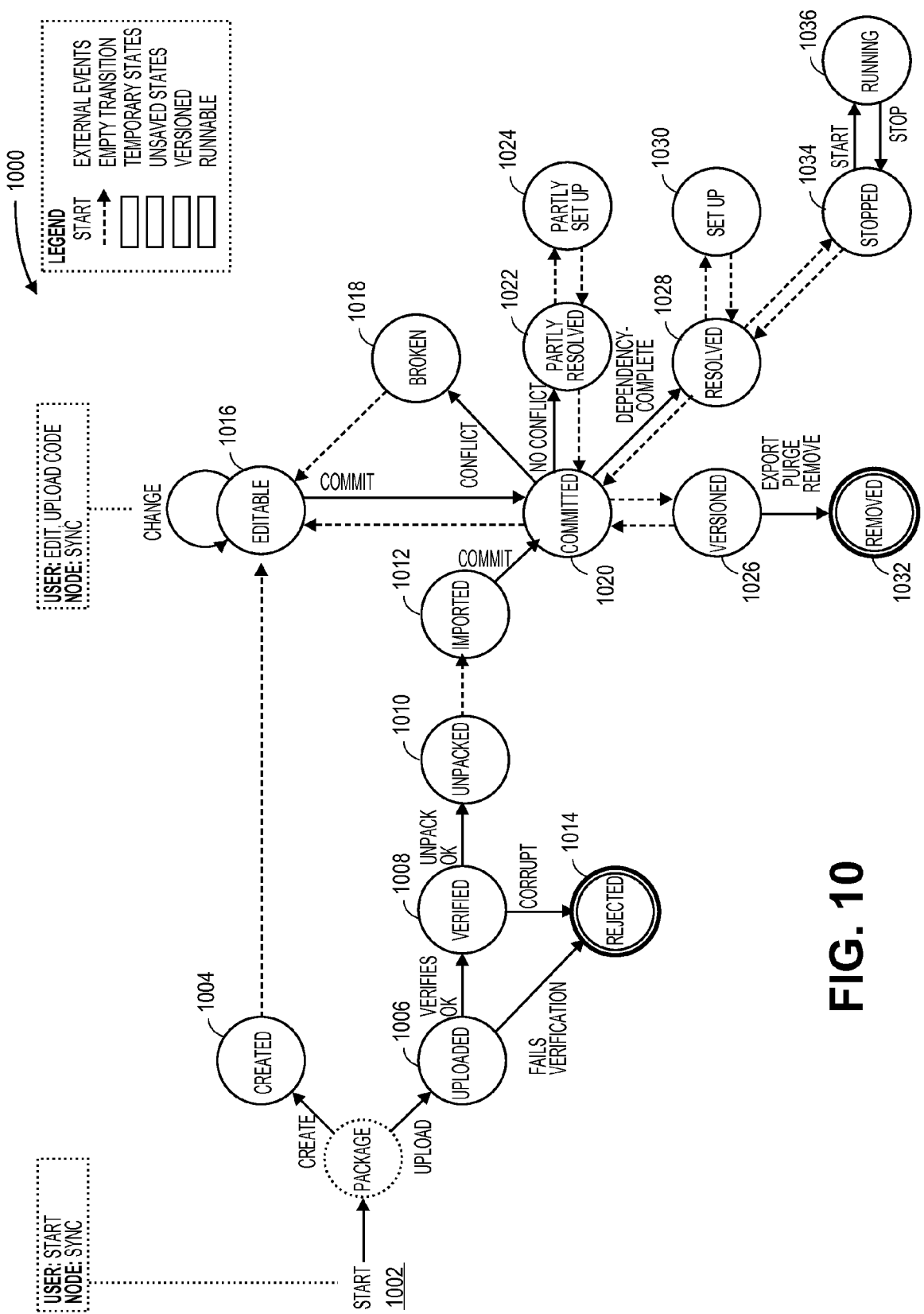
FIG. 10 is the state diagram showing states of the application that are based upon current states of the support environment in accordance with some embodiments.

FIG. 10 is the state diagram showing states of the application that are based upon current states of the support environment, in accordance with some embodiments. The state diagram 1000 show states that spring from starting application, and from changing it. In particular, upon start 1002, an application package can be created 1004 based on user input (such as input provided via the UI of FIG. 2), or uploaded 1006 if it already exists. When the application package is uploaded 1006, it is verified 1008. If it fails verification, it is rejected 1014. Alternatively, it is verified 1008, unpacked 101, imported 1012 and committed 1020 to version control. A new application package created at 1004 or an existing application package can be edited 1016 and committed 1020 to version control.

Once the application package is committed 1020 to version control, it can be versioned 1026 and subsequently removed 1032 if needed. If there is a conflict during the commit 1020, the application goes through the broken state 1018 and becomes editable 1016. If there is no conflict, the application package moves to the partly resolved state 1022 and partly setup state 1024 to begin identifying dependencies of the application and configuring the application. Once all dependencies are identified, the application package moves to the resolved state 1028 and the setup state 1030. The resolved state 1028 can bring the application into the stopped state 1034 which can follow by the running state 1036 when the application is started. Subsequently, if the application is stopped, it moves back to the stopped state 1034.

Figure 11:
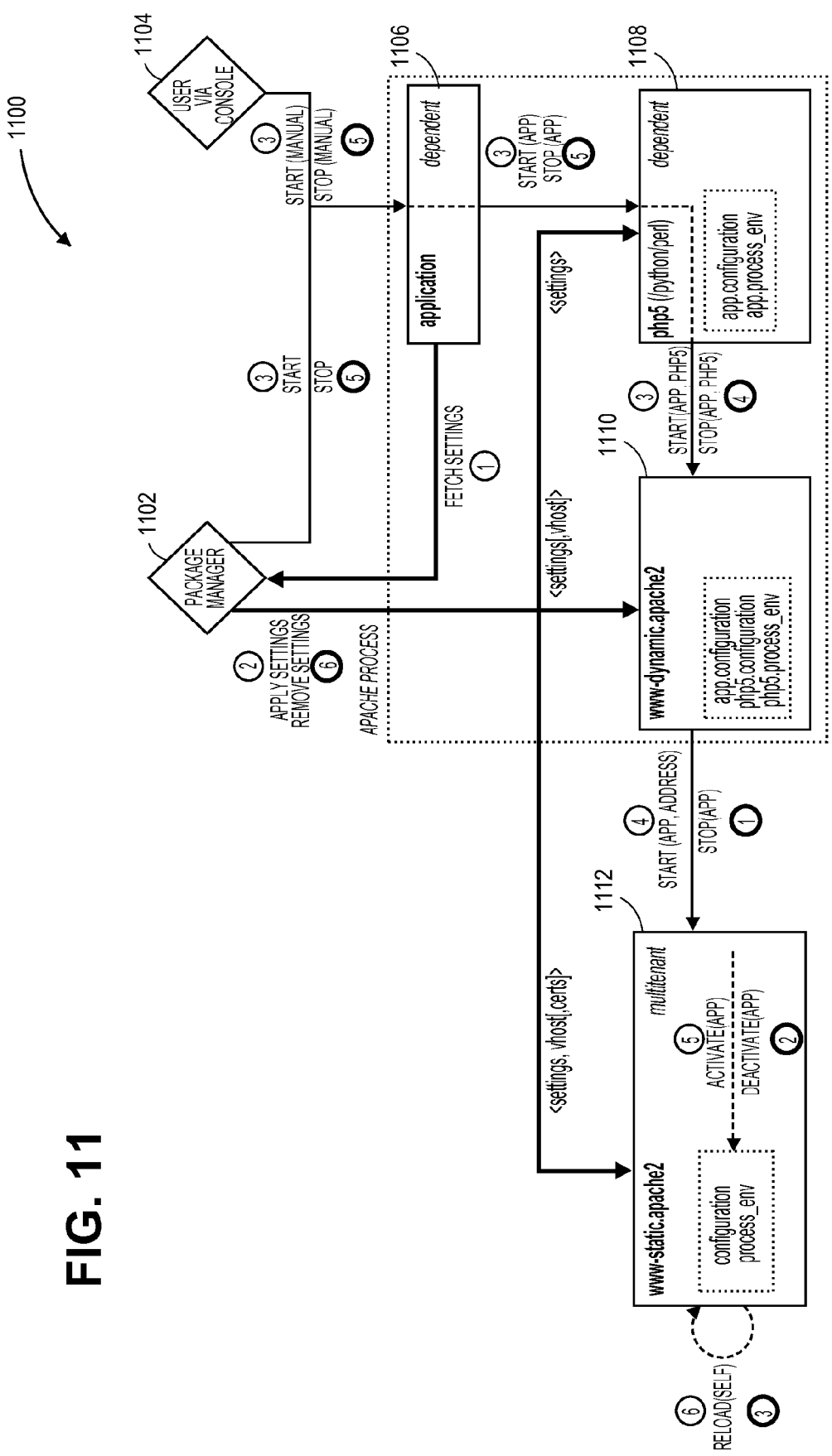
FIG. 11 is a data and control flow diagram depicting the installation and removal of settings, in the context of starting and stopping the application, performed by the facility in some embodiments.

FIG. 11 is a data and control flow diagram 1100 depicting the installation and removal of settings, in the context of starting and stopping the application, in accordance with some embodiments. The data and control flow diagram 1100 shows a start sequence (white numbers) that can be initiated by a user via a console 1104 or automatically by a package manager 1102. The start sequence is initiated by fetching application settings from the application package 1106. The application settings may include cartridge configuration, vhost files, certificates, etc.). The cartridge configuration is then applied to cartridges. In the illustrated example, cartridges include a static web server 1112, a dynamic web server 1110 and a language runtime 1108.

Further, the application's start hook is invoked, which results in starting the dynamic web server cartridge 1110 (since neither the application nor its host cartridge 1108 are executable processes in the illustrated example). Once started, the cartridge 1110 calls the start hook of the cartridge 1112, which initiates the configuration process and then reloads itself when the configuration is completed.

The stop sequence (black numbers) is performed when the application's stop hook is initiated by the package manager 1102 as part of application removal or in response to a user request via the console 1104. The application 1106 delegates running of its stop hook to the application's host cartridge 1108, which depends on the cartridge 1110, and therefore delegates it to the cartridge 1110. The cartridge 1110 calls the stop hook of the cartridge 1112 using the application name. The cartridge 1112 deactivates the configuration of the cartridge 1112 for the application and reloads itself, thus ceasing to serve requests on behalf of the application. The cartridge 1110 then stops itself, which in turn shuts down the cartridge 1108 and the application 1106. If stop was called due to application removal, the package manager 1102 removes any settings pertaining to the application 1106 from the cartridges 1108, 1110 and 1112, and then removes the application package.

FIG. 12-16 are flow diagrams of various embodiments of package management methods. The methods are performed by processing logic that may comprise hardware (circuitry, dedicated logic, etc.), software (such as is run on a general purpose computer system or a dedicated machine), or a combination of both. In one embodiment, the methods are performed by the platform 154 running on the host 110, 120, and in particular by a package manager within the platform 154.

Figure 12:
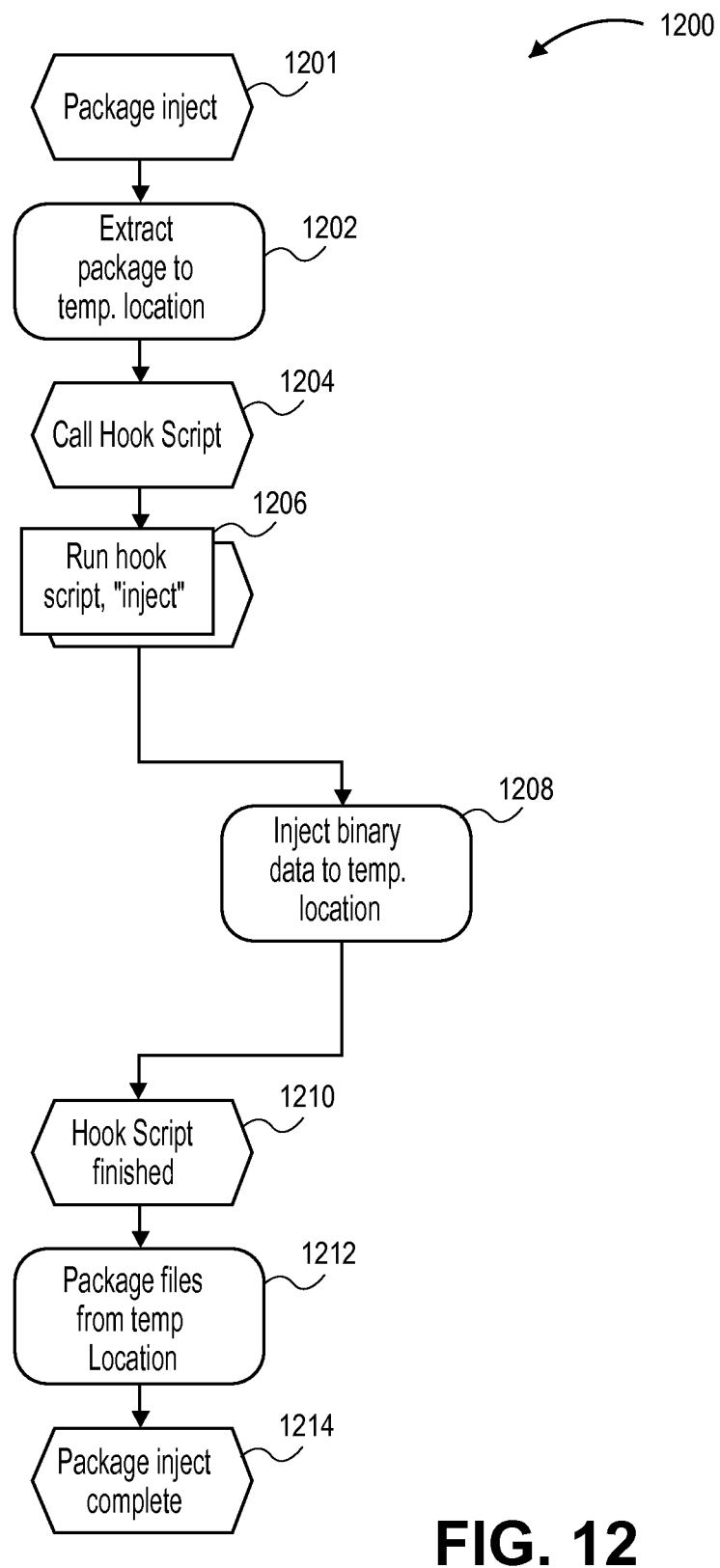
FIG. 12 is a flow diagram of one embodiment of a method for injecting an empty cartridge package.

FIG. 12 is a flow diagram of one embodiment of a method 1200 for injecting an empty cartridge package to allow users who have a license to inject binary data. At block 1201, a package inject process starts. At block 1202, a cartridge package is extracted to a temporary location. At block 1204, a hook script is called. At block 1206, hook script "inject" is run, causing binary data to be injected to a temporary location (block 1208). Once the hook script is finished (block 1210), the packages files are removed from the temporary location (1212) and the package inject process ends (block 1214).

Figure 13:
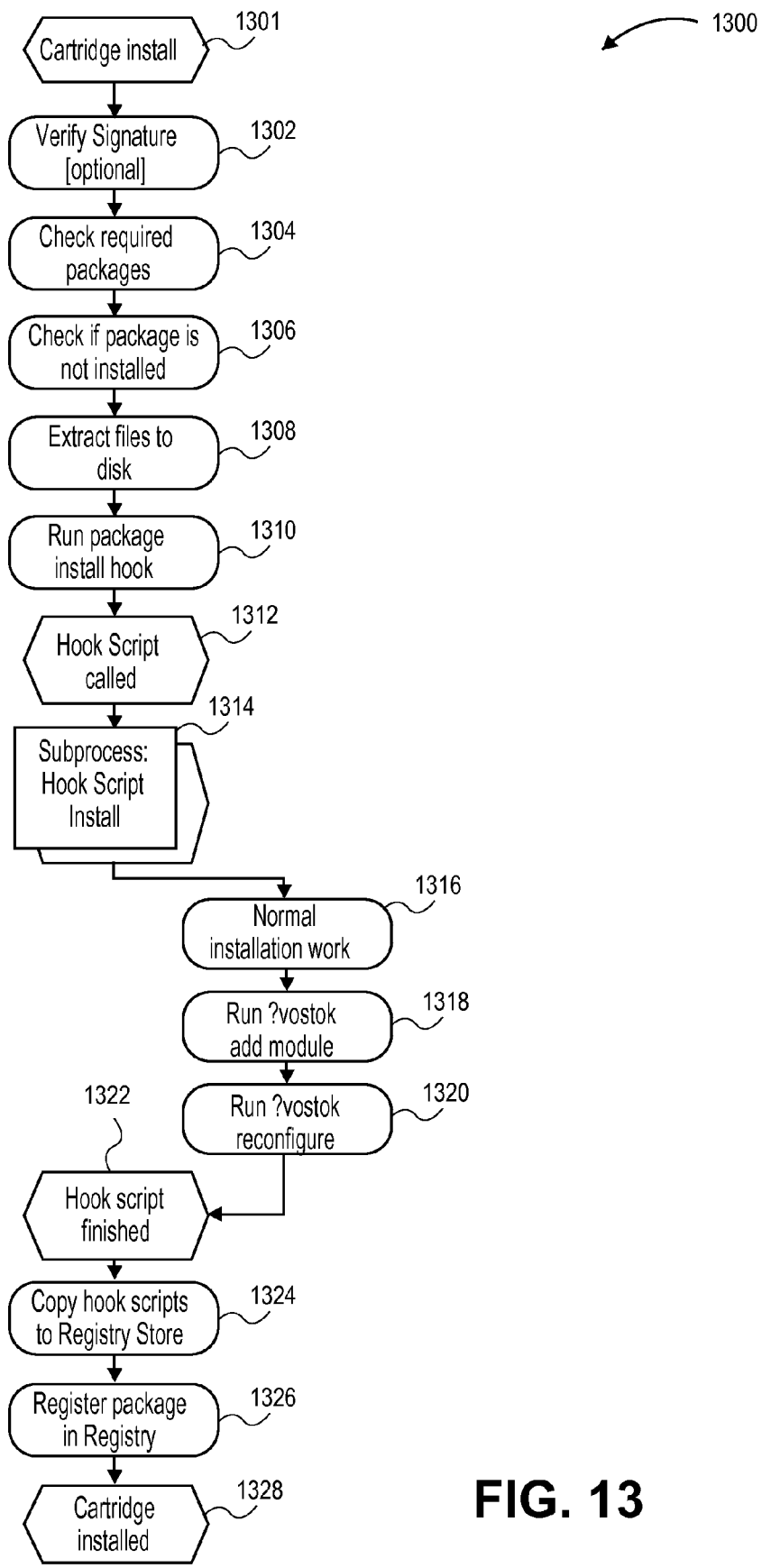
FIG. 13 is a flow diagram of one embodiment of a method for installing a cartridge.

FIG. 13 is a flow diagram of one embodiment of a method 1300 for installing a cartridge. At block 1301, a cartridge install process starts. At block 1302, the signature of the cartridge is verified to prevent tampering. At block 1304, the required packages (e.g., the cartridge package and other packages on which this cartridge depends) are identified. At block 1306, the package manager verifies that all required packages are installed. At block 1308, the files are extracted and saved to disk. At block 1310, the package manager submits a request to run a package install hook, which causes the hook script to be called (block 1312) and an install subprocess to start (block 1314). The install subprocess performs installation (block 1316), adds required modules to the platform (block 1318) and configures the cartridge (block 1320) as discussed above. When the hook script is finished (block 1322), the hook script is copied to a registry store (block 1324), and the package is registered in the registry (block 1326), completing the installation of the cartridge (block 1328).

Figure 14:
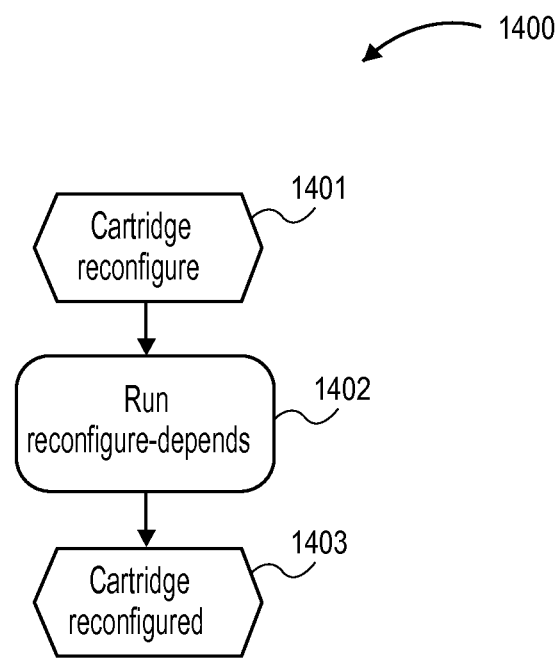
FIG. 14 is a flow diagram of one embodiment of a method for reconfiguring a cartridge.

FIG. 14 is a flow diagram of one embodiment of a method 1400 for reconfiguring a cartridge. At block 1401, a cartridge reconfigure process starts. At block 1402, the cartridge is reconfigured based on configuration information specified in the application. At block 1403, the reconfiguration of the cartridge is completed.

Figure 15:
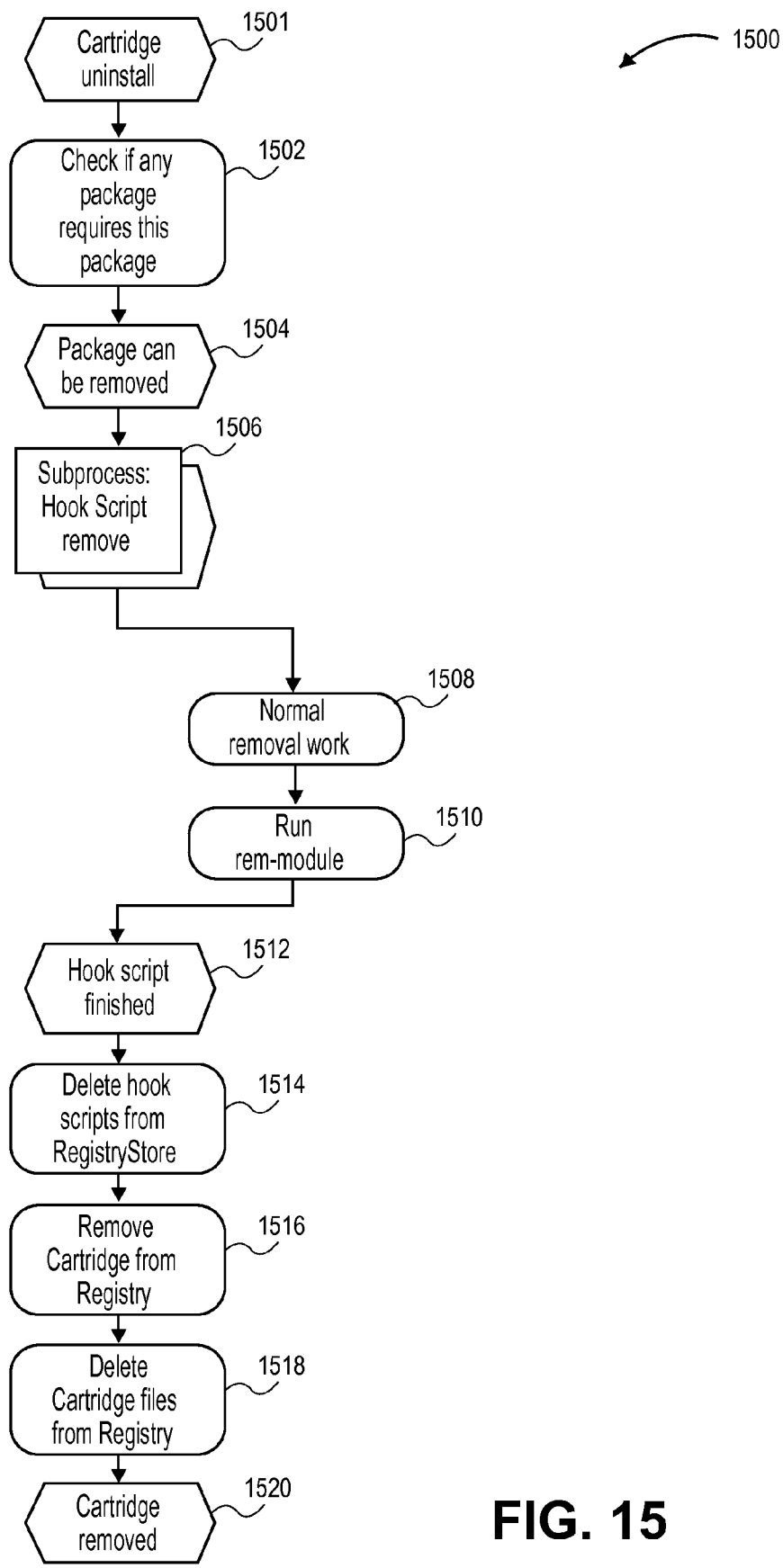
FIG. 15 is a flow diagram of one embodiment of a method for removing a cartridge.

FIG. 15 is a flow diagram of one embodiment of a method 1500 for removing a cartridge. At block 1501, a cartridge uninstall process starts. At block 1502, the package manager checks whether any other packages require this cartridge. At block 1504, a request to remove the cartridge is issued (block 1504), starting a subprocess that runs a remove hook script (1506). The subprocess performs removal operations 1508 and 1510, finishing the execution of the hook script (block 1512). Further, the package manager deletes hook scripts from the registry store (block 1514), removes the cartridge from the registry (block 1516) and deletes cartridge files from the registry (block 1518), completing the removal of the cartridge (block 1520).

Figure 16:
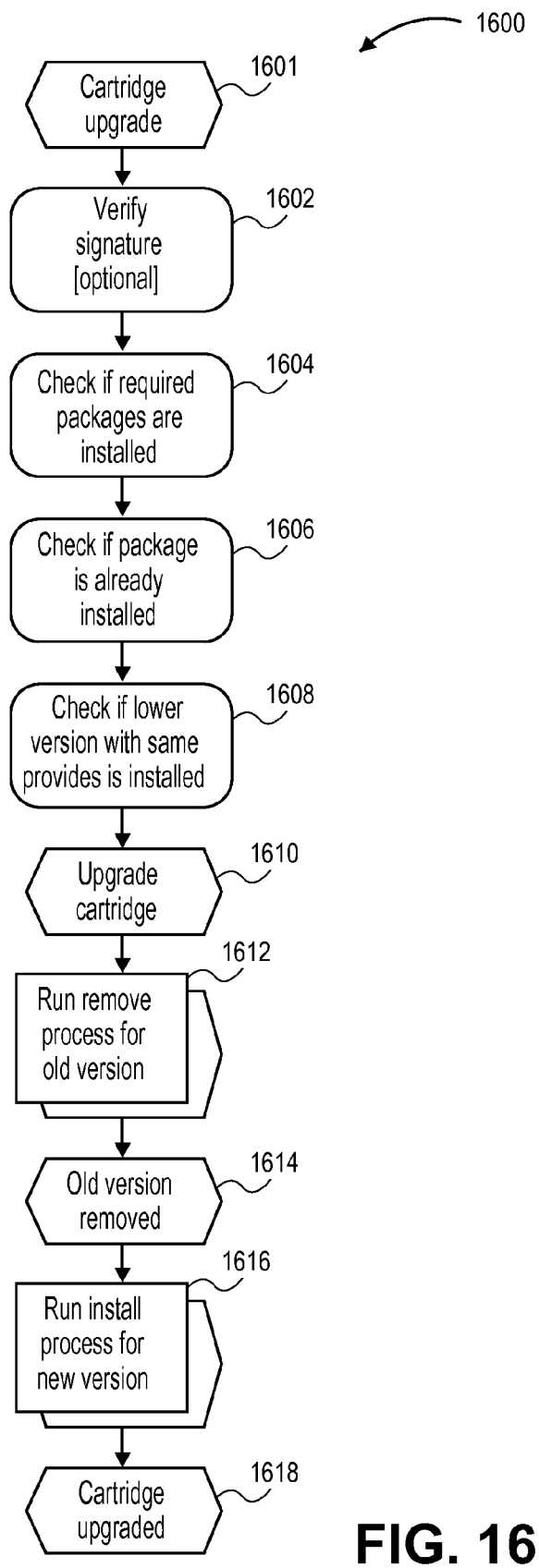
FIG. 16 is a flow diagram of one embodiment of a method for upgrading a cartridge.

FIG. 16 is a flow diagram of one embodiment of a method 1600 for upgrading a cartridge. At block 1601, a cartridge upgrade process starts. At block 1602, the package manager verifies the signature of the new package. At block 1604, the package manager verifies that all required packages are installed. At block 1606, the package manager verifies that the upgrade package is already installed. At block 1608, the package manager verifies that the lower version of the cartridge is installed. At block 1610, the package manager issues a request to upgrade the cartridge (block 1610), causing the removal of the old version to start (block 1612). Once the old version is removed (block 1614), the install process for the new version is performed (block 1616), and the cartridge upgrade completes (block 1618).

An exemplary package layout will now be discussed in more detail. Application metadata, as well as application and cartridge configuration may be stored inside the application package. Similarly, cartridges providing base configuration may store it within their own cartridge package. Both application packages and cartridges may use essential the same package format. A package may include two top-level directories, bundle and info. Optionally, there may be a data directory as well. The bundle directory may hold user files, and the info directory may hold package metadata as well as package-managed files such as configuration files, hooks, or scaffolding templates. An exemplary layout is provided in Table 1 below.

TABLE 1

```
<package-name>/                            - (auto-generated)
|--bundle/                                 - bundled software. This is $VS_HOME
|       `-- .data/                         - symlinks to data directories
|              |-- cache                   -> ../../data/cache
|              |-- local                   -> ../../data/local
|              |-- logs                    -> ../../data/logs
|              |-- share                   -> ../../data/share
|              `-- tmp                     -> ../../data/tmp
|-- info/                                  - package meta information
|       |-- control                        - main control file
|       |-- changelog                      - internal build number
|       |-- alternatives/                  - environment alternatives
|       |       `-- <name>/                - one directory per named environment
|       |             -- ...
|       |-- defaults/                      - cartridge scaffolding directory
|       |       |-- idl                    - configuration wizard IDL spec
|       |       `-- <package-name>/        - scaffolding (cartridge-specific)
|       |             -- ...
|       |-- files                          - file spec: ownership, permissions, etc.
|       |-- hooks/                         - hooks: start, stop, configure, etc.
|       |-- logs                           - log file descriptor
|       |-- setup                          - dependant setup files, configuration
|       |       |-- mapping                - (optional) mapping rules
|       |       `-- <dependency>/          - one directory per dependency
|       |             -- ...
|       |-- md5sums                        - md5 digests (optional, Python 2.4)
|       |-- sha512sums                     - sha512 digests (reserved)
|       |-- signature                      - package signature (optional)
|       `-- version                        - package format version
`-- data/
        |-- cache/                         - secondary data ($VS_CACHE)
        |-- local/                         - node-local persistent data ($VS_LOCAL)
        |-- logs/                          - node-local log files ($VS_LOGS)
        |-- repository/                    - (internal) version history when exported
        |-- store/                         - (internal) performance/deployment history
        |-- share/                         - cluster-wide persistent data ($VS_SHARE)
        `-- tmp/                           - temporary files ($VS_TMP)
```

The platform may manage 5 application-specific storage areas: (1) cache—secondary data that are cached for performance reasons by can be recreated from original sources at any point; (2) local—for other node-local persistent data; (3) logs—for node-local application log files; (4) share—for persistent data that are to be shared across the cluster; the application is responsible for managing concurrent access to files, if any; and (4) tmp—for temporary files; files in this directory are not expected to survive a restart of the application. The above directories may be made accessible to the application in two ways: (1) in the file system under $VS_HOME/.data/{cache,local,logs,share,tmp}; and (2) via environment variables VS_{CACHE,LOCAL,LOGS,SHARE,TMP}.

As discussed above, packages may expose internal functionality via hooks. In some embodiments, hooks are published in the info/hooks directory and must be executable. In some embodiments, all hooks are optional and not every file stored in info/hooks is automatically a hook. Some files may contain shared code and as such be not executable, etc. Hook discovery may be performed solely by calling a special info hook. As a result, if a package exposes any hook at all, it should provide an info hook.

Hooks may include standard hooks and custom hooks. Standard hooks are hooks that are called by the package management system if they exist. Not all hooks may have the same parameter list. The info hook may be used to obtain usage information. Table 2 below lists exemplary standard hooks.

other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1700 includes a processing device 1702, a main memory 1704 (e.g., read-only memory (ROM), flash memory, dynamic random access memory (DRAM) such as synchronous DRAM (SDRAM) or DRAM (RDRAM), etc.), a static memory 1706 (e.g., flash memory, static random access memory (SRAM), etc.), and a secondary memory 1716 (e.g., a data storage device in the form of a drive unit, which may include fixed or removable computer-readable storage medium), which communicate with each other via a bus 1708.

Processing device 1702 represents one or more general-purpose processing devices such as a microprocessor, central

TABLE 2

| Name | Description |
| --- | --- |
| info | Without arguments print a list of hooks and arguments to stdout, one hook per line. Each line is a tab-separated list of tokens starting with the hook name. Remaining tokens are argument names or syntactic markers. Syntactic markers are: '{' and '}' for grouping, '|' for logical alternatives, and the well known regular expression quantifiers '?', '*', and '+'. Groups may be nested. Quantifiers are postfixed. Example response: start\tapplication-name\t{\taddress\t}\t? |
| info name | Print arguments to stdout for a specific hook. Print an empty line (or no line) if name is unknown. |
| pre-install | This hook is called immediately before the package files are installed in their final location. The hook takes no arguments. However, as with all hooks VS_HOME is set in the environment and will hold the final destination path. This hook is currently reserved for internal purposes. |
| post-install | This hook is called immediately after the package files, have been installed in their final location. The hook takes no arguments. |
| configure package directory | This hook is called with a package name and a directory. The cartridge will then recurse into that directory and pick and choose whatever file it needs to configure itself for the package. |
| deconfigure package | Deconfigures the cartridge for the named package. |
| start | Start the software contained in the package. When called by the package management system, this hook takes no arguments. |
| stop | Stop the software contained in the package. |
| pre-remove | This hook is called immediately before the package files are removed from their install location. The hook takes no arguments. |
| post-remove | This hook is called immediately after the package files are removed from their install location. The hook takes no arguments. However as with all hooks VS_HOME is set in the environment and will hold the final destination path. This hook is currently reserved for internal purposes. |

Figure 17:
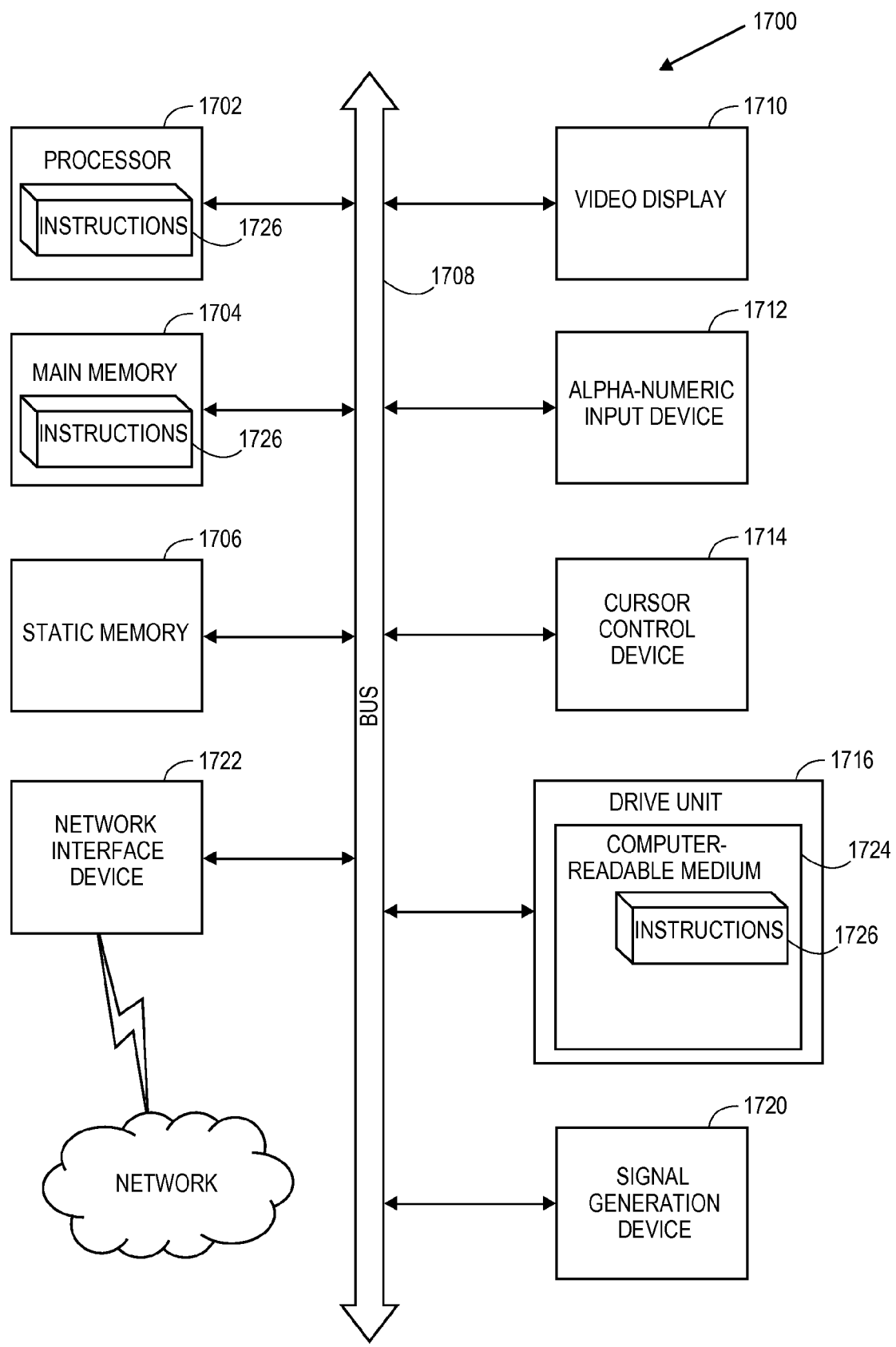
FIG. 17 illustrates a diagrammatic representation of a machine in the exemplary form of a computer system.

FIG. 17 is a diagram of one embodiment of a computer system for facilitating the execution of a web application in a cloud. Within the computer system 1700 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host 110, 120 in a cloud 130, a cloud provider system 104, a cloud controller 108 or any processing unit, or the like. More particularly, the processing device 1702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. Processing device 1702 is configured to execute the instructions 1726 for performing the operations and steps discussed herein.

The computer system 1700 may further include a network interface device 1722. The computer system 1700 also may include a video display unit 1710 (e.g., a liquid crystal display (LCD) or a cathode ray tube (CRT)) connected to the computer system through a graphics port and graphics chipset, an alphanumeric input device 1712 (e.g., a keyboard), a cursor control device 1714 (e.g., a mouse), and a signal generation device 1720 (e.g., a speaker).

The secondary memory 1716 may include a machine-readable storage medium (or more specifically a computer-readable storage medium) 1724 on which is stored one or more sets of instructions 1726 embodying any one or more of the methodologies or functions described herein. The instructions 1726 may also reside, completely or at least partially, within the main memory 1704 and/or within the processing device 1702 during execution thereof by the computer system 1700, the main memory 1704 and the processing device 1702 also constituting machine-readable storage media. The instructions 1726 may further be transmitted or received over a network 1718 via the network interface device 1722.

The computer-readable storage medium 1724 may also be used to store the instructions 1726 persistently. While the computer-readable storage medium 1724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 1726, components and other features described herein can be implemented as discrete hardware components or integrated in the functionality of hardware components such as ASICS, FPGAs, DSPs or similar devices. In addition, the instructions 1726 can be implemented as firmware or functional circuitry within hardware devices. Further, the instructions 1726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting," "generating," "performing," "storing," "updating," "implementing," "determining," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically establishing a support environment for a program is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   identifying, by a processing device, a support environment feature depended upon by a program to execute on a virtual machine, the execution of the program being facilitated by a Platform-as-a-Service (PaaS) environment; the PaaS environment including an Infrastructure-as-a-Service (IaaS) with a platform running on said IaaS; the platform being delivered as an auto-clustering virtual machine image, resulting in one or more virtual machines;

selecting a support software component indicated to provide the feature in view of the identified support environment feature, wherein the selecting is executed by applying a business logic to the support component; the support component comprising a list of hooks in the support component;

loading the selected support component on the one or more virtual machines;

configuring the selected support component in view of the program; and causing the program, the selected support component, and a hook to be executed on the one or more virtual machine;

receiving an indication that a status for the selected support component has changed from available to unavailable;

pausing the execution of the program;

unloading the selected support component from the one or more virtual machines;

determining an alternative support component;

loading the alternative support component on the one or more virtual machines; and unpausing the execution of the program.

2. The method of claim 1, further comprising, for the selected support component:

identifying a support environment feature depended upon by the selected support component; for the feature identified for the selected support component, identifying a support component indicated to provide the feature.

3. The method of claim 1 wherein the support environment feature is identified using a dependency declaration explicitly constructed for the program.

4. The method of claim 1 wherein the identifying comprises analyzing an application's code to infer the identified support environment feature.

5. The method of claim 1 wherein the program is coded in an interpreted or compiled language, and the identified support environment feature is a runtime for the interpreted or compiled language.

6. The method of claim 1 wherein the program is a web application, and the identified support environment feature includes a static web server service and a dynamic web server service.

7. The method of claim 1 wherein the program is a web application, and the identified support environment feature includes a middleware service.

8. The method of claim 1 wherein the program is a web application, and the identified support environment feature includes a framework service.

9. A method comprising:

identifying, by a processing device, a support environment feature depended upon by a program to execute on a virtual machine, the execution of the program being facilitated by a Platform-as-a-Service (PaaS) environment; the PaaS environment including an Infrastructure-as-a-Service (IaaS) with a platform running on said IaaS; the platform being delivered as an auto-clustering virtual machine image, resulting in one or more virtual machines;

detecting, after a support environment has been established for the program by loading a first support component indicated to provide a business logic, and a support environment feature identified as being depended upon by the program, an event relating to an availability of a second support component indicated to provide a selected identified feature, the first support component comprising a list of hooks in the first support component;

causing the program, the first support component, and a hook to be executed on the one or more virtual machines;

receiving an indication that a status for the first support component has changed from available to unavailable;

pausing the execution of the program;

in response to the event, unloading the loaded first support component indicated to provide the selected feature;

loading the second support component indicated to provide the selected feature other than the unloaded first support component, and unpausing the execution of the program.

10. The method of claim 9 further comprising:

prior to the unloading, pausing execution of the program; and subsequent to the loading, resuming execution of the program.

11. The method of claim 10 wherein the detected event is an indication that a new support component indicated to provide the selected feature has become available.

12. A non-transitory computer readable storage medium including instructions that, when executed by a processing device, cause the processing device to execute operations for establishing a support environment for a program, the operations comprising:

identifying, by the processing device, a support environment feature depended upon by the program to execute on a virtual machine, the execution of the program being facilitated by a Platform-as-a-Service (PaaS) environment; the PaaS environment including an Infrastructure-as-a-Service (IaaS) with a platform running on said IaaS; the platform being delivered as an auto-clustering virtual machine image, resulting in one or more virtual machines;

selecting a support software component indicated to provide the feature in view of the identified support environment feature, wherein the selecting is executed by applying a business logic to the support component, the support component comprising a list of hooks in the support component;

loading the selected support component on the one or more virtual machines;

configuring the selected support component in view of the program;

causing the program, the selected support component, and a hook to be executed on the one or more virtual machines;

receiving an indication that a status for the selected support component has changed from available to unavailable;

pausing the execution of the program;

unloading the selected support component from the one or more virtual machines;

determining an alternative support component;

loading the alternative support component on the one or more virtual machines; and unpausing the execution of the program.

13. The non-transitory computer readable storage medium of claim 12, wherein the operations further comprises:

for the selected support component, identifying a support environment feature depended upon by the selected support component;

for the feature identified for the selected support component, identifying a support component indicated to provide the feature.

14. The non-transitory computer readable storage medium of claim 12 wherein the support environment feature is identified using dependency declarations explicitly constructed for the program.

15. The non-transitory computer readable storage medium of claim 12 wherein the identifying comprises analyzing an application's code to infer the identified support environment features.

16. The non-transitory computer readable storage medium of claim 12 wherein the program is coded in an interpreted or compiled language, and the identified support environment feature is a runtime for the interpreted or compiled language.

17. The non-transitory computer readable storage medium of claim 12 wherein the program is a web application, and the identified support environment feature includes a static web server service and a dynamic web server service.

18. The non-transitory computer readable storage medium of claim 12 wherein the program is a web application, and the identified support feature includes a middleware service.

19. The non-transitory computer readable storage medium of claim 12 wherein the program is a web application, and the identified support environment feature includes a framework service.

20. A system comprising:
a memory; and
a processing device, coupled to the memory, the processing device to:
identify, by the processing device, a support environment feature depended upon by a program to execute on a virtual machine, the execution of the program being facilitated by a Platform-as-a-Service (PaaS) environment; the PaaS environment including an Infrastructure-as-a-Service (IaaS) with a platform running on said IaaS; the platform being delivered as an auto-clustering virtual machine image, resulting in one or more virtual machines;
detect, after a support environment has been established for the program by loading a first support component indicated to provide a business logic, and a support environment feature identified as being depended upon by the program, an event relating to an availability of a second support component indicated to provide a selected identified feature, the first support component comprising a list of hooks in the first support component;
cause the program, the first support component, and a hook to be executed on the one or more virtual machines;
in response to the event, unload the loaded first support component indicated to provide the selected feature;
load the second support component indicated to provide the selected feature other than the unloaded support component;
receive an indication that a status for the first support component has changed from available to unavailable;
pause the execution of the program;
unload the first support component from the one or more virtual machines;
determine an alternative support component;
load the alternative support component on the one or more virtual machines; and
unpause the execution of the program.

21. The system of claim 20 the processing device further to: prior to the unloading, pause execution of the program; and subsequent to the loading, resume execution of the program.

22. The system of claim 20 wherein the detected event is an indication that a new support component indicated to provide the selected feature has become available.

* * * * *